United States Patent
Sugiyama et al.

[11] Patent Number: 5,557,473
[45] Date of Patent: Sep. 17, 1996

[54] WIDE ANGLE LENS

[75] Inventors: Yoshikazu Sugiyama, Yokohama; Haruo Sato, Kawasaki, both of Japan

[73] Assignee: Nikon Corporation, Tokyo, Japan

[21] Appl. No.: 222,867

[22] Filed: Apr. 5, 1994

[30] Foreign Application Priority Data

Apr. 13, 1993 [JP] Japan .................. 5-085987

[51] Int. Cl.$^6$ ............................ G02B 9/62
[52] U.S. Cl. ............ 359/757; 359/752; 359/793
[58] Field of Search ................. 359/740, 752, 359/753, 757, 793

[56] References Cited

U.S. PATENT DOCUMENTS

| | | | |
|---|---|---|---|
| 3,955,883 | 11/1976 | Sugiyama | 359/752 |
| 4,008,952 | 2/1977 | Nakagawa | 350/215 |
| 4,099,850 | 7/1978 | Matsui | 359/752 |
| 4,221,467 | 9/1980 | Imai | 350/215 |
| 4,333,714 | 6/1982 | Kreitzer | 359/752 X |
| 4,352,544 | 10/1982 | Imai | 359/757 |
| 5,042,929 | 8/1991 | Tanaka | 359/752 X |

FOREIGN PATENT DOCUMENTS 56-22406  3/1981  Japan.

Primary Examiner—David C. Nelms
Assistant Examiner—Son Mai
Attorney, Agent, or Firm—Shapiro and Shapiro

[57] ABSTRACT

A wide angle lens includes, in turn from the object side, a first lens group having a negative refracting power, and a second lens group having a positive refracting power. The first lens group includes, in turn from the object side, a first lens component having a positive refracting power, and a second lens component having a negative refracting power. The second lens group includes, in turn from the object side, a third lens component having a positive refracting power, a fourth lens component having a negative refracting power, a fifth lens component having a positive refracting power, and a sixth lens component having a positive refracting power. The lens satisfies the following conditions:

$$0.4 \leq d_4/f \leq 1$$

$$1.65 \leq (N_5+N_6)/2 \leq 1.8$$

where $d_4$ is the air space between the second and third lens components, f is the focal length of the entire system, $N_5$ is the refractive index of the fifth lens component with respect to a d-line, and $N_6$ is the refractive index of the sixth lens component with respect to a d-line.

15 Claims, 3 Drawing Sheets

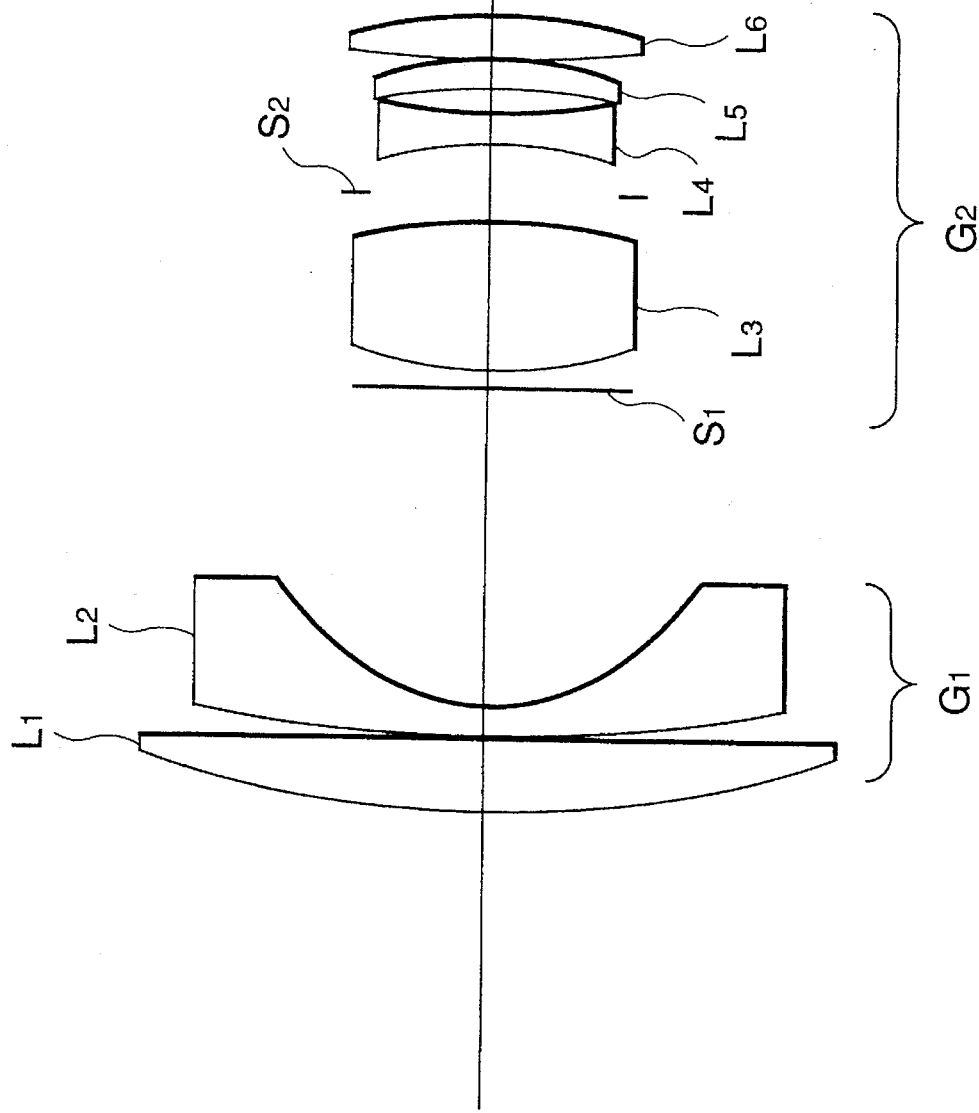

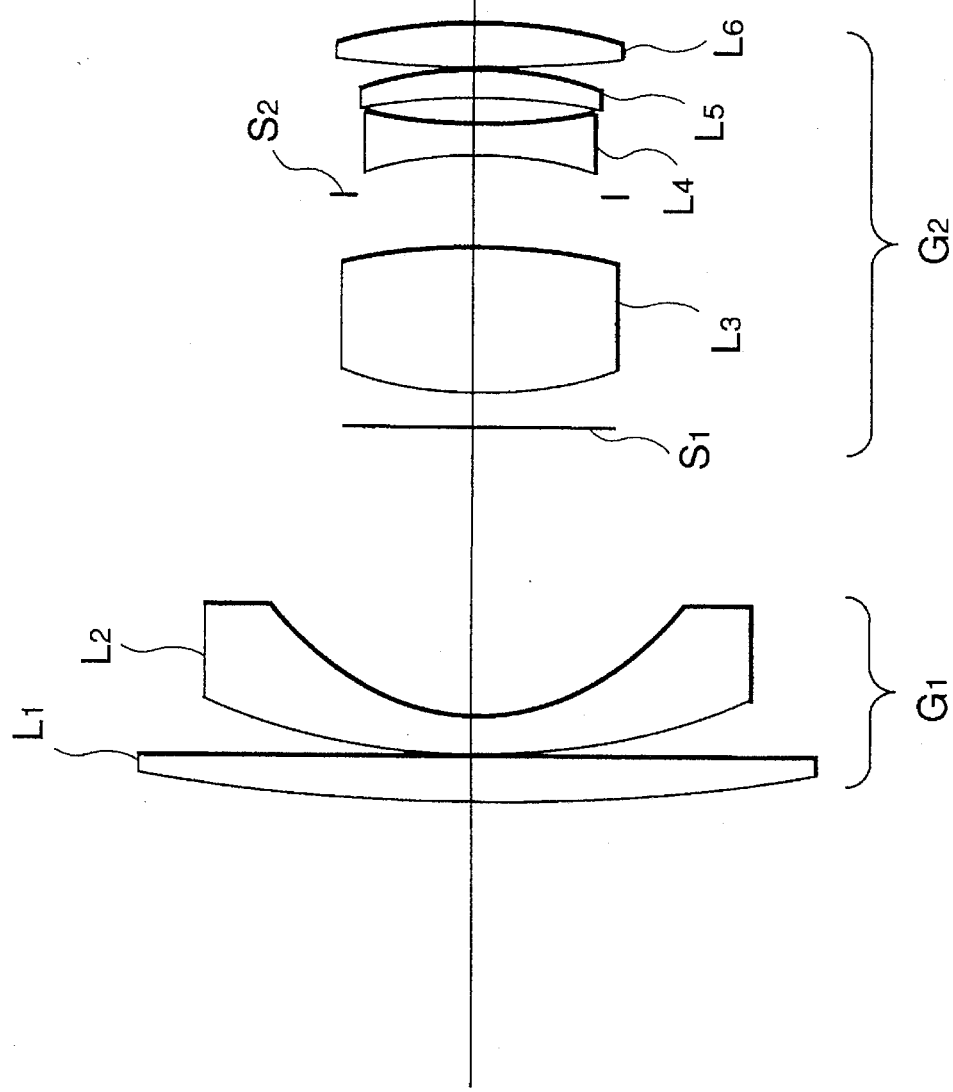

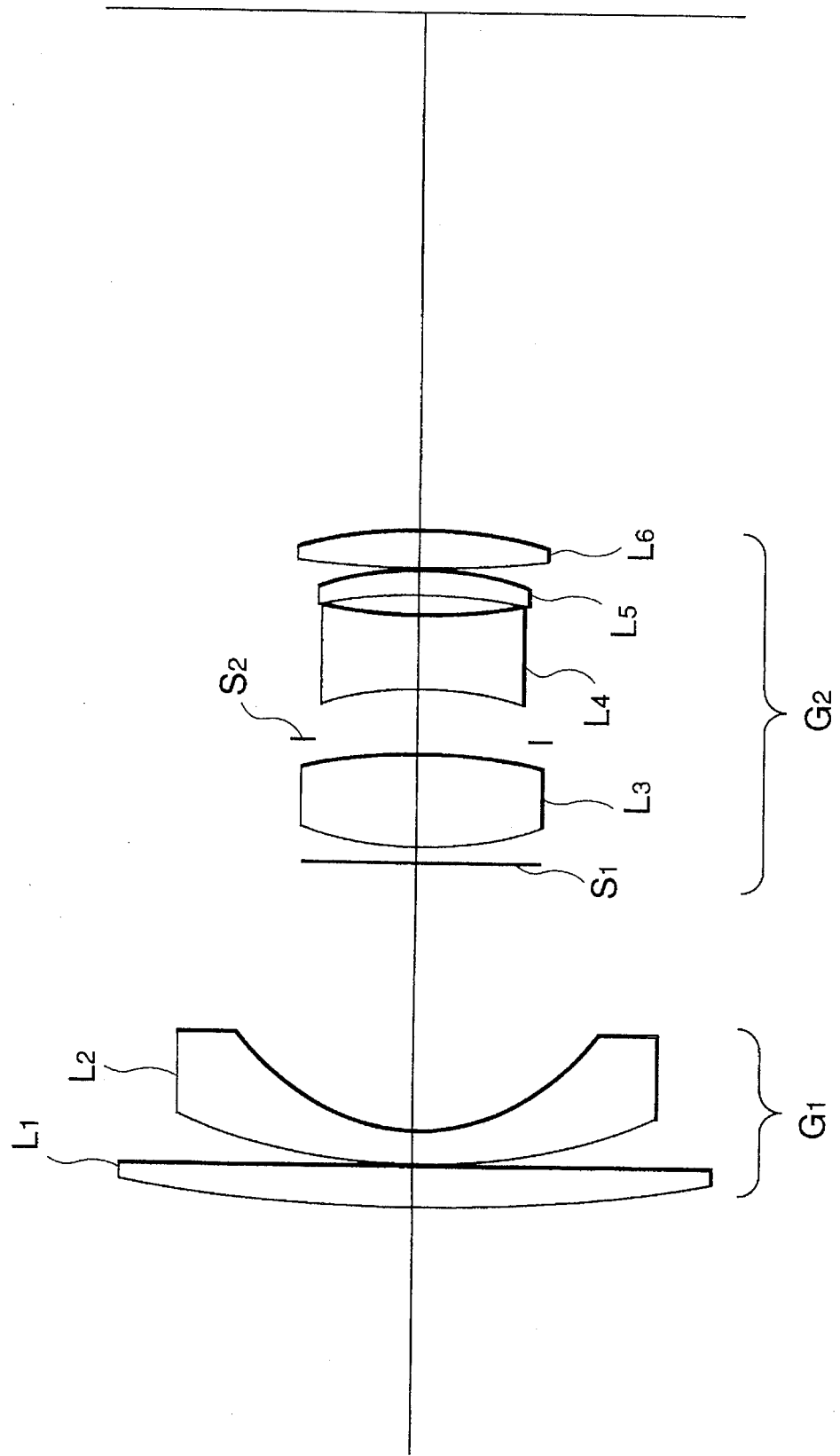

WIDE ANGLE LENS

BACKGROUND OF THE INVENTION

1. Field of the Invention

The present invention relates to a retrofocus type wide angle lens and, more particularly, to a wide angle lens which has a total field angle of about 75°, and has an aperture ratio as bright as about 1:2.8.

2. Related Background Art

Some conventional retrofocus type wide angle lenses are made compact using a small number of lenses. As a wide angle lens of this type, lenses disclosed in, e.g., U.S. Pat. Nos. 4,008,952 and 4,221,467, and Japanese Laid-Open Patent Application No. 56-22406 are known.

However, a wide angle lens disclosed in U.S. Pat. No. 4,008,952 has a back focus as short as about 1.07 times its focal length, and is not practical as a lens for a single-lens reflex camera. Furthermore, the wide angle lens disclosed in U.S. Pat. No. 4,008,952 has a total field angle as narrow as 64°, and an aperture ratio as dark as 1:3.5.

Although wide angle lenses disclosed in U.S. Pat. No. 4,221,467 and Japanese Laid-Open Patent Application No. 56-22406 are made compact, since coma is substantial at the upper and lower peripheral portions of the frame, these wide angle lenses have poor imaging performance at these portions, and cannot be put into practical applications.

SUMMARY OF THE INVENTION

It is, therefore, an object of the present invention to provide a wide angle lens which has a long back focus and excellent imaging performance while it has a short total lens length and is compact.

In order to achieve the above object, a wide angle lens according to the present invention includes, in turn from the object side, a first lens group having a negative refracting power, and a second lens group having a positive refracting power, the first lens group including, in turn from the object side, a first lens component having a positive refracting power and a second lens component having a negative refracting power, and the second lens group including, in turn from the object side, a third lens component having a positive refracting power, a fourth lens component having a negative refracting power, a fifth lens component having a positive refracting power, and a sixth lens component having a positive refracting power. If an air space between the second and third lens components is represented by $d_4$, the focal length of the entire system is represented by f, the refractive index of the fifth lens component with respect to a d-line is represented by $N_5$, and the refractive index of the sixth lens component with respect to a d-line is represented by $N_6$, the wide angle lens of the present invention is constituted to satisfy the following conditions:

$$0.4 \leq d_4/f \leq 1 \quad (1)$$

$$1.65 \leq (N_5+N_6)/2 \leq 1.8 \quad (2)$$

When the synthesized focal length of the first lens component ($L_1$) and the second lens component ($L_2$) is represented by $f_{12}$, and the focal length of the entire system is represented by f, it is desirable that the wide angle lens of the present invention satisfy the following condition:

$$-1.6 \leq f_{12}/f \leq -1 \quad (3)$$

Also, when the radius of curvature of the image-side lens surface of the second lens component is represented by $r_4$, and the focal length of the entire system is represented by f, it is desirable that the wide angle lens of the present invention satisfy the following condition:

$$0.43 \leq r_4/f \leq 0.6 \quad (4)$$

According to the present invention, a retrofocus type wide angle lens is constituted by the first lens group $G_1$ as a front group divergent system, and the second lens group $G_2$ as a rear group convergent system.

According to the present invention, the air space between the first and second lens groups $G_1$ and $G_2$ is defined to fall within an optimal range by condition (1). When the air space exceeds the upper limit of condition (1), the air space $d_4$ between the second and third lens components $L_2$ and $L_3$, i.e., the interval between the first and second lens groups $G_1$ and $G_2$, becomes large, and the total length of the wide angle lens increases, thus sporting a compact structure. When the air space is smaller than the lower limit of condition (1), the air space $d_4$ becomes small, and the entire wide angle lens is made compact. However, in order to assure a practical back focus, the refracting power of the first lens group $G_1$ must be increased. This is not preferable since it becomes difficult to correct the coma at the lower portion of the frame, distortion, and chromatic aberration of magnification. In order to achieve better imaging performance, it is preferable to set the lower limit value of condition (1) to be 0.65 or more.

The second lens group $G_2$ of the present invention must have a large refracting power to focus light rays diverged by the first lens group $G_1$. At this time, fifth and sixth lens components $L_5$ and $L_6$ which are arranged at the image side have relatively large refracting powers. In the wide angle lens of the present invention, since only two lens components have a negative refracting power, i.e., the second and fourth lens components $L_2$ and $L_4$, the Petzval's sum tends to be large.

Thus, according to the present invention, condition (2) defines a refractive index range of a glass material optimal for the fifth and sixth lens components $L_5$ and $L_6$, thereby suppressing various aberrations generated by these lens components.

When the refractive index exceeds the upper limit of condition (2), since the fifth and sixth lens components $L_5$ and $L_6$ consist of a glass material having a high refractive index, the Petzval's sum can be decreased. However, in this case, since the dispersive power of the glass material increases as well, it undesirably results in generation of a chromatic aberration of magnification. In order to further improve imaging performance, it is desirable to set the upper limit value of condition (2) to be larger than 1.67. When the refractive index is smaller than the lower limit value of condition (2), the refractive indices of the fifth and sixth lens components $L_5$ and $L_6$ decrease, and their dispersive powers also decrease. In this case, although generation of a chromatic aberration of magnification can be suppressed, a spherical aberration is substantial, and the Petzval's sum increases, thus making correction of the curvature of field difficult.

According to the present invention, it is desirable that condition (3) above be satisfied under the above-mentioned arrangement. Condition (3) is a condition for defining the synthesized focal length $f_{12}$ of the first and second lens components $L_1$ and $L_2$ so as to make the wide angle lens compact.

When the synthesized focal length is smaller than the lower limit of condition (3), the focal length of the first lens group $G_1$ is shortened, and in order to assure a desired back focus, the air space $d_4$ between the first and second lens groups $G_1$ and $G_2$ must be increased. At this time, the total length of the wide angle lens undesirably increases, and a compact structure is sported. In order to attain a further compact structure, it is preferable that the lower limit value of condition (3) be set to be $-1.5$ or more. When the synthesized focal length exceeds the upper limit of condition (3), it is not preferable since a coma at the lower portion of the frame, a distortion, and a chromatic aberration of magnification are considerably generated. In order to further improve imaging performance, it is preferable that the upper limit value of condition (3) be set to be $-1.1$.

According to the present invention, it is desirable to satisfy condition (4) above. Condition (4) defines an optimal range of the radius of curvature of the image-side lens surface of the second lens component $L_2$.

When the radius of curvature is smaller than the lower limit value of condition (4), it is not preferable since a coma at the lower portion of the frame and a negative distortion are substantial. At this time, in order to obtain better imaging performance, it is desirable to set the lower limit value of condition (4) to be 0.45. When the radius of curvature exceeds the upper limit value of condition (4), it is not preferable since the refracting power of the second lens component $L_2$ decreases, and the back focus is shortened.

In the wide angle lens according to the present invention, it is desirable to satisfy the following condition in addition to the above-mentioned conditions.

$$-9 \leq r_6/f \leq -0.9 \qquad (5)$$

where $r_6$: the radius of curvature of the image-side lens surface of the third lens component $L_3$, f: the focal length of the entire system.

Condition (5) is a condition for defining the radius of curvature of the image-side lens surface of the third lens component $L_3$ so as to satisfactorily correct the coma at the lower portion of the frame.

When the radius of curvature is smaller than the lower limit value of condition (5), it is not preferable since it becomes difficult to correct the coma at the lower portion of the frame generated on the image-side lens surface of the second lens component $L_2$. In order to further satisfactorily correct the coma at the lower portion of the frame, it is preferable to set the lower limit value of condition (5) to be $-7.5$. On the other hand, when the radius of curvature exceeds the upper limit of condition (5), it is not preferable since the coma at the lower portion of the frame generated on the image-side lens surface of the second lens component $L_2$ is excessively corrected. In order to further satisfactorily correct the coma at the lower portion of the frame, it is preferable to set the upper limit value of condition (5) to be $-1.1$.

In actual design of a lens, various mechanical limitations are imposed. For example, in the case of an exchangeable lens for a single-lens reflex camera, the position of an aperture stop is limited. In a retrofocus type wide angle lens like in the present invention, when the aperture stop is arranged between the third and fourth lens components $L_3$ and $L_4$, the aperture mechanism and a mount may mechanically interfere with each other due to the short focal length.

At this time, in order to prolong the interval between the aperture stop and the mount to prevent the interference, the back focus may be prolonged. However, in the retrofocus type wide angle lens like in the present invention, imaging performance apparently deteriorates. Therefore, the interval from the aperture stop to the mount must be prolonged by prolonging the interval from the aperture stop to the most image-side lens surface (to be referred to as a final surface hereinafter). At this time, if the interval from the aperture stop to the final surface is prolonged, the position of the exit pupil is separated from the final surface, and off-axis rays pass through positions separated from the optical axis when they pass through the most image-side sixth lens component $L_6$. Thus, distortion is generated, and the lens diameter of the sixth lens component $L_6$ is undesirably increased.

Thus, according to the present invention, the lens thickness of each lens component located at the image side of the aperture stop is increased. With this structure, since the same effect as that obtained when a plane-parallel plate is inserted in the air space at the image side of the aperture stop is obtained, the position of the exit pupil approaches the final surface. Therefore, elimination of the distortion and a decrease in lens diameter of the sixth lens component $L_6$ can be attained.

At this time, according to the present invention, if the thickness, on the optical axis, of the fourth lens component $L_4$ is represented by $d_8$, the thickness, on the optical axis, of the fifth lens component $L_5$ is represented by $d_{11}$, and the thickness, on the optical axis, of the sixth lens component $L_6$ is represented by $d_{13}$, it is desirable to satisfy the following condition:

$$0.2 \leq (d_8+d_{11}+d_{13})/f \leq 0.5 \qquad (6)$$

When the interval from the aperture mechanism to the final surface is prolonged, if the lens thicknesses of the three lens components are smaller than the lower limit of condition (6), since the exit pupil is separated away from the final surface, this undesirably results in an increase in lens diameter of the sixth lens component $L_6$ and generation of a distortion. When the lens thicknesses of the three lens components exceed the upper limit of condition (6), the lens thicknesses of the fourth to sixth lens components $L_4$ to $L_6$ become large, and the total weight of the entire wide angle lens undesirably increases.

Other objects, features, and merits of the present invention will be sufficiently understood from the following description.

BRIEF DESCRIPTION OF THE DRAWINGS

FIG. 1 is a lens diagram showing a first embodiment of the present invention;

FIG. 2 is a lens diagram showing a second embodiment of the present invention; and FIG. 3 is a lens diagram showing a third embodiment of the present invention.

DETAILED DESCRIPTION OF THE PREFERRED EMBODIMENTS

The preferred embodiments of the present invention will be described hereinafter with reference to the accompanying drawings.

FIG. 1 is a lens diagram showing the first embodiment of the present invention. Referring to FIG. 1, a wide angle lens according to the first embodiment of the present invention comprises, in turn from the object side, a first lens group $G_1$ having a negative refracting power and a second lens group $G_2$ having a positive refracting power.

As shown in FIG. 1, the first lens group $G_1$ comprises, in turn from the object side, a meniscus first lens component $L_1$ having a positive refracting power, and having a convex surface facing the object side, and a meniscus second lens component $L_2$ having a negative refracting power, and having a convex surface facing the object side. The second lens group $G_2$ comprises, in turn from the object side, a double-convex third lens component $L_3$ having a positive refracting power, a double-concave fourth lens component $L_4$ having a negative refracting power, a meniscus fifth lens component $L_5$ having a positive refracting power, and having a concave surface facing the object side, and a double-convex sixth lens component $L_6$ having a positive refracting power. An aperture stop $S_2$ is arranged between the third and fourth lens components $L_3$ and $L_4$. Note that FIG. 1 illustrates a fixed stop $S_1$ arranged between the second and third lens components $L_2$ and $L_3$.

Data values of the first embodiment will be listed below. In a data table of the first embodiment, f is the focal length, $F_{NO}$ is the f-number, 2 ω is the field angle. The numerals in the leftmost column represent the order of lenses from the object side, r is the radius of curvature of the lens surface, d is the lens surface interval, n is the refractive index with respect to a d-line (λ=587.6 nm), and v is the Abbe's number.

TABLE 1

[First Embodiment]
f = 28.6 mm, $F_{NO}$ = 2.86, 2ω = 75.4°

| | r | d | v | n | |
|---|---|---|---|---|---|
| 1 | 64.716 | 4.10 | 47.1 | 1.62374 | $L_1$ |
| 2 | 611.391 | 0.20 | | | |
| 3 | 91.780 | 2.00 | 60.0 | 1.64000 | $L_2$ |
| 4 | 14.852 | 19.99 | | | |
| 5 | ∞ | 1.10 | | | $S_1$ |
| 6 | 27.266 | 8.99 | 45.4 | 1.79668 | $L_3$ |
| 7 | −66.939 | 1.50 | | | |
| 8 | ∞ | 3.50 | | | $S_2$ |
| 9 | −24.961 | 2.00 | 25.5 | 1.80458 | $L_4$ |
| 10 | 37.892 | 1.20 | | | |
| 11 | −48.991 | 2.00 | 54.0 | 1.71300 | $L_5$ |
| 12 | −21.070 | 0.10 | | | |
| 13 | 127.850 | 2.60 | 52.3 | 1.74810 | $L_6$ |
| 14 | −31.250 | 38.05 | | | |

The condition corresponding values according to the present invention will be listed below.

TABLE 2

(Condition Corresponding Values)

(1) $d_4/f = 0.737$
(2) $(n_5 + n_6)/2 = 1.7305$
(3) $f_{12}/f = -1.359$
(4) $r_4/f = 0.519$
(5) $r_6/f = -2.341$
(6) $(d_8 + d_{11} + d_{13})/f = 0.276$

The second embodiment of the present invention will be described below with reference to FIG. 2. FIG. 2 is a lens diagram showing the second embodiment of the present invention. In the second embodiment, the first lens component $L_1$ of the positive refracting power comprises a double-convex lens. Since other lens components $L_2$ to $L_6$ are the same as those in the first embodiment shown in FIG. 1, a detailed description thereof will be omitted.

Data values of the second embodiment will be listed below. In a data table of the second embodiment, f is the focal length, $F_{NO}$ is the f-number, 2 ω is the field angle. The numerals in the leftmost column represent the order of lenses from the object side, r is the radius of curvature of the lens surface, d is the lens surface interval, n is the refractive index with respect to a d-line (λ=587.6 nm), and v is the Abbe's number.

TABLE 3

[Second Embodiment]
f = 28.6 mm, $F_{NO}$ = 2.86, 2ω = 75.4°

| | r | d | v | n | |
|---|---|---|---|---|---|
| 1 | 143.818 | 3.00 | 41.4 | 1.57501 | $L_1$ |
| 2 | −682.265 | 0.20 | | | |
| 3 | 53.361 | 2.00 | 55.6 | 1.69680 | $L_2$ |
| 4 | 14.562 | 19.49 | | | |
| 5 | ∞ | 1.60 | | | $S_1$ |
| 6 | 24.471 | 10.20 | 45.1 | 1.74400 | $L_3$ |
| 7 | −48.509 | 1.50 | | | |
| 8 | ∞ | 3.50 | | | $S_2$ |
| 9 | −22.306 | 2.40 | 26.1 | 1.78470 | $L_4$ |
| 10 | 34.717 | 1.15 | | | |
| 11 | −69.907 | 2.20 | 55.6 | 1.69680 | $L_5$ |
| 12 | −20.290 | 0.10 | | | |
| 13 | 82.166 | 2.60 | 51.1 | 1.73350 | $L_6$ |
| 14 | −47.883 | 38.07 | | | |

The condition corresponding values according to the present invention will be listed below.

TABLE 4

(Condition Corresponding Values)

(1) $d_4/f = 0.737$
(2) $(n_5 + n_6)/2 = 1.7155$
(3) $f_{12}/f = -1.215$
(4) $r_4/f = 0.508$
(5) $r_6/f = -1.696$
(6) $(d_8 + d_{11} + d_{13})/f = 0.295$

The third embodiment of the present invention will be described below with reference to FIG. 3. Since the arrangements of the lens components $L_2$ to $L_6$ are the same as those in the second embodiment shown in FIG. 2, a detailed description thereof will be omitted.

Data values of the third embodiment will be listed below. In a data table of the third embodiment, f is the focal length, $F_{NO}$ is the f-number, 2 ω is the field angle. The numerals in the leftmost column represent the order of lenses from the object side, r is the radius of curvature of the lens surface, d is the lens surface interval, n is the refractive index with respect to a d-line (λ=587.6 nm), and v is the Abbe's number.

TABLE 5

[Third Embodiment]
f = 28.6 mm, $F_{NO}$ = 2.86, 2ω = 75.4°

| | r | d | v | n | |
|---|---|---|---|---|---|
| 1 | 137.071 | 3.00 | 33.8 | 1.64831 | $L_1$ |
| 2 | −4003.097 | 0.20 | | | |
| 3 | 62.375 | 2.00 | 58.5 | 1.65160 | $L_2$ |
| 4 | 15.301 | 21.10 | | | |
| 5 | ∞ | 1.10 | | | $S_1$ |
| 6 | 26.626 | 6.30 | 45.4 | 1.79668 | $L_3$ |
| 7 | −60.568 | 1.40 | | | |
| 8 | ∞ | 3.60 | | | $S_2$ |

TABLE 5-continued

[Third Embodiment]
f = 28.6 mm, $F_{NO}$ = 2.86, 2ω = 75.4°

|  | r | d | v | n |  |
| --- | --- | --- | --- | --- | --- |
| 9 | −26.792 | 5.60 | 26.1 | 1.78470 | $L_4$ |
| 10 | 33.729 | 1.15 | | | |
| 11 | −77.113 | 2.20 | 55.6 | 1.69680 | $L_5$ |
| 12 | −22.209 | 0.10 | | | |
| 13 | 84.648 | 3.00 | 54.0 | 1.71300 | $L_6$ |
| 14 | −47.047 | 38.09 | | | |

The condition corresponding values according to the present invention will be listed below.

TABLE 6

(Condition Corresponding Values)

(1) $d_4/f$ = 0.776
(2) $(n_5 + n_6)/2$ = 1.7050
(3) $f_{12}/f$ = −1.337
(4) $r_4/f$ = 0.535
(5) $r_6/f$ = −2.118
(6) $(d_8 + d_{11} + d_{13})/f$ = 0.4218

As described above, according to each of the embodiments of the present invention, although the wide angle lens has a total length as small as 3.05 times the focal length, and is compact, a back focus as large as about 1.42 times the focal length can be assured, and the distortion, spherical aberration, and comas at the upper and lower portions of the frame as drawbacks of the retrofocus type wide angle lens are satisfactorily corrected.

What is claimed is:

1. A wide angle lens comprising, in order from an object side:

a first lens group having a negative refracting power, and a second lens group having a positive refracting power, said first lens group comprising, in order from the object side, a first lens component having a positive refracting power, and a second lens component having a negative refracting power, and said second lens group comprising, in order from the object side, a third lens component having a positive refracting power, a fourth lens component having a negative refracting power, a fifth lens component having a positive refracting power, and a sixth lens component having a positive refracting power, and wherein said wide angle lens is constituted to satisfy the following conditions:

$0.4 \leq d_4/f \leq 1$ $1.65 \leq (N_5+N_6)/2 \leq 1.8$ $-1.6 \leq f_{12}/f \leq -1$ $0.43 \leq r_4/f \leq 0.6$ where f: the focal length of the entire system, $d_4$: the air space between said second and third lens components, $N_5$: the refractive index of said fifth lens component with respect to a d-line, $N_6$: the refractive index of said sixth lens component with respect to a d-line, $f_{12}$: the synthesized focal length of said first and second lens components, and $r_4$: the radius of curvature of an image-side lens surface of said second lens component.

2. A lens according to claim 1, which is constituted to satisfy the following condition:

$-9 \leq r_6/f \leq -0.9$ where $r_6$ is the radius of curvature of an image-side lens surface of said third lens component.

3. A lens according to claim 1, which is constituted to satisfy the following condition:

$0.2 \leq (d_8+d_{11}+d_{13})/f \leq 0.5$ where $d_8$ is the lens thickness, on the optical axis, of said fourth lens component, $d_{11}$ is the lens thickness, on the optical axis, of said fifth lens component, and $d_{13}$ is the lens thickness, on the optical axis, of said sixth lens component.

4. A lens according to claim 2, and which is constituted to satisfy the following condition:

$0.2 \leq (d_8+d_{11}+d_{13})/f \leq 0.5$ where $d_8$ is the lens thickness, on the optical axis, of said fourth lens component, $d_{11}$ is the lens thickness, on the optical axis, of said fifth lens component, and $d_{13}$ is the lens thickness, on the optical axis, of said sixth lens component.

5. A wide angle lens comprising, in order from an object side:

a first lens group having a negative refracting power, and a second lens group having a positive refracting power, said first lens group comprising, in order from the object side, a first lens component having a positive refracting power, and a second lens component having a negative refracting power, and said second lens group comprising, in order from the object side, a third lens component having a positive refracting power, a fourth lens component having a negative refracting power, a fifth lens component having a positive refracting power, and a sixth lens component having a positive refracting power, and wherein said wide angle lens is constituted to satisfy the following conditions:

$0.4 \leq d_4/f \leq 1$ $1.65 \leq (N_5+N_6)/2 \leq 1.8$ $-1.6 \leq f_{12}/f \leq -1$ where $d_4$ is the air space between said second and third lens components, f is the focal length of the entire system, $N_5$ is the refractive index of said fifth lens component with respect to a d-line, $N_6$ is the refractive index of said sixth lens component with respect to a d-line, and $f_{12}$ is the synthesized focal length of said first and second lens components.

6. A lens according to claim 5, and which is constituted to satisfy the following condition:

$0.43 \leq r_4/f \leq 0.6$ where $r_4$ is the radius of curvature of an image-side lens surface of said second lens component.

7. A lens according to claim 5, and which is constituted to satisfy the following condition:

$$-9 \leq r_6/f \leq -0.9$$

where $r_6$ is the radius of curvature of an image-side lens surface of said third lens component.

8. A lens according to claim 5, and which is constituted to satisfy the following condition:

$$0.2 \leq (d_8+d_{11}+d_{13})/f \leq 0.5$$

where $d_8$ is the lens thickness, on the optical axis, of said fourth lens component, $d_{11}$ is the lens thickness, on the optical axis, of said fifth lens component, and $d_{13}$ is the lens thickness, on the optical axis, of said sixth lens component.

9. A lens according to claim 5, wherein a stop is arranged in an optical path between said third and fourth lens components.

10. A lens according to claim 5, wherein a fixed stop is arranged in an optical path between said first and second lens groups.

11. A wide angle lens comprising, in order from an object side:

a first lens group having a negative refracting power, and a second lens group having a positive refracting power, said first lens group comprising, in order from the object side, a first lens component having a positive refracting power, and a second lens component having a negative refracting power, and said second lens group comprising, in order from the object side, a third lens component having a positive refracting power, a fourth lens component having a negative refracting power, a fifth lens component having a positive refracting power, and a sixth lens component having a positive refracting power, and wherein said wide angle lens is constituted to satisfy the following conditions:

$$0.4 \leq d_4/f \leq 1$$

$$1.65 \leq (N_5+N_6)/2 \leq 1.8$$

$$-9 \leq r_6/f \leq -0.9$$

where $d_4$ is the air space between said second and third lens components, f is the focal length of the entire system, $N_5$ is the refractive index of said fifth lens component with respect to a d-line, $N_6$ is the refractive index of said sixth lens component with respect to a d-line, and $r_6$ is the radius of curvature of an image-side lens surface of said third lens component.

12. A lens according to claim 11, and which is constituted to satisfy the following condition:

$$0.43 \leq r_4/f \leq 0.6$$

where $r_4$ is the radius of curvature of an image-side lens surface of said second lens component.

13. A lens according to claim 11, and which is constituted to satisfy the following condition:

$$0.2 \leq (d_8+d_{11}+d_{13})/f \leq 0.5$$

where $d_8$ is the lens thickness, on the optical axis, of said fourth lens component, $d_{11}$ is the lens thickness, on the optical axis, of said fifth lens component, and $d_{13}$ is the lens thickness, on the optical axis, of said sixth lens component.

14. A lens according to claim 11, wherein a stop is arranged in an optical path between said third and fourth lens components.

15. A lens according to claim 11, wherein a fixed stop is arranged in an optical path between said first and second lens groups.

\* \* \* \* \*